United States Patent
Yoshifuji

(10) Patent No.: US 10,678,329 B2
(45) Date of Patent: Jun. 9, 2020

(54) LINE-OF-SIGHT INPUT DEVICE, AND METHOD OF LINE-OF-SIGHT INPUT

(71) Applicant: ORYLAB INC., Tokyo (JP)

(72) Inventor: Kentaro Yoshifuji, Mitaka (JP)

(73) Assignee: ORYLAB INC., Tokyo (JP)

( * ) Notice: Subject to any disclaimer, the term of this patent is extended or adjusted under 35 U.S.C. 154(b) by 42 days.

(21) Appl. No.: 15/956,751

(22) Filed: Apr. 19, 2018

(65) Prior Publication Data
US 2018/0239426 A1 Aug. 23, 2018

Related U.S. Application Data

(63) Continuation of application No. PCT/JP2016/081025, filed on Oct. 19, 2016.

(30) Foreign Application Priority Data

Oct. 19, 2015 (JP) .................. 2015-205946

(51) Int. Cl.
*G06F 3/01* (2006.01)
*G06F 3/0346* (2013.01)
(Continued)

(52) U.S. Cl.
CPC ............. *G06F 3/013* (2013.01); *G06F 3/01* (2013.01); *G06F 3/038* (2013.01); *G06F 3/0346* (2013.01);
(Continued)

(58) Field of Classification Search
CPC ........ G06F 3/013; G06F 3/0346; G06F 3/038; G06F 3/0487; G06T 7/70
See application file for complete search history.

(56) References Cited

U.S. PATENT DOCUMENTS

| | | |
|---|---|---|
| 7,561,143 B1 | 7/2009 | Milekic |
| 2010/0204608 A1 | 8/2010 | Sugio et al. |
| | (Continued) | |

FOREIGN PATENT DOCUMENTS

| | | |
|---|---|---|
| CN | 1285994 | 11/2006 |
| CN | 101515199 | 1/2011 |
| | (Continued) | |

OTHER PUBLICATIONS

"Notice of Allowance of Taiwan Counterpart Application," dated Jun. 27, 2019, p. 1-p. 3, in which the listed reference was/references were cited.

(Continued)

*Primary Examiner* — David F Dunphy
(74) *Attorney, Agent, or Firm* — JCIPRNET

(57) ABSTRACT

A line-of-sight input device includes a detection means that detects a point of gaze or an eyeball rotational movement of the user, a movement control means that moves the input element; and an input determining means that determine an input of the input element near a predetermined position when a predetermined condition is satisfied; wherein the movement control means increases a movement speed of the input element as the point of gaze is farther from the predetermined position or a rotation angle of the eyeball rotational movement is larger, and makes the movement speed closer to zero as the point of gaze becomes nearer to the predetermined position or a rotation angle of the eyeball rotational movement becomes smaller.

12 Claims, 9 Drawing Sheets

(51) Int. Cl.
*G06F 3/038* (2013.01)
*G06T 7/70* (2017.01)
*G06F 3/0488* (2013.01)
*G06F 3/0487* (2013.01)

(52) U.S. Cl.
CPC .......... *G06F 3/0487* (2013.01); *G06F 3/0488* (2013.01); *G06T 7/70* (2017.01)

(56) References Cited

U.S. PATENT DOCUMENTS

| | | | |
|---|---|---|---|
| 2012/0272179 A1 | 10/2012 | Stafford | |
| 2013/0326431 A1 | 12/2013 | Bjorklund et al. | |
| 2014/0375544 A1* | 12/2014 | Venable | G06F 3/013 345/156 |
| 2015/0135133 A1 | 5/2015 | Munoz-Bustamante | |
| 2015/0138079 A1* | 5/2015 | Lannsjo | G06F 3/013 345/156 |
| 2016/0170485 A1* | 6/2016 | Naruse | B60K 35/00 345/8 |
| 2016/0363995 A1* | 12/2016 | Rougeaux | G06T 7/73 |
| 2017/0060413 A1* | 3/2017 | Singh | G06F 3/0237 |

FOREIGN PATENT DOCUMENTS

| | | |
|---|---|---|
| CN | 101754715 | 7/2012 |
| CN | 102169348 | 7/2012 |
| EP | 1679577 | 7/2006 |
| JP | 2004-287823 | 10/2004 |
| JP | 2005-100366 | 4/2005 |
| JP | 5077879 | 11/2012 |
| WO | 2014181543 | 11/2014 |

OTHER PUBLICATIONS

"Written Opinion of the International Searching Authority (Form PCT/ISA/237)" of PCT/JP2016/081025, dated Jan. 10, 2017, with English translation thereof, pp. 1-11.

"Search Report of Europe Counterpart Application", dated Mar. 15, 2019, p. 1-p. 10.

"Office Action of Japan Counterpart Application," dated Dec. 27, 2017, with English translation thereof, p. 1-p. 6, in which the listed references were cited.

"International Search Report (Form PCT/ISA/210)" of PCT/JP2016/081025, dated Jan. 10, 2017, with English translation thereof, pp. 1-2.

"Office Action of Europe Counterpart Application", dated Feb. 5, 2020, p. 1-p. 8.

"Office Action of Korea Counterpart Application," with English translation thereof, dated Sep. 4, 2019, p. 1-p. 11.

Office Action of Korea Counterpart Application, with English translation thereof, dated Mar. 24, 2020, pp. 1-7.

* cited by examiner

| 1 | 2 | 3 | 4 | 5 | 6 | 7 | 8 | 9 | 0 |
|---|---|---|---|---|---|---|---|---|---|
| Q | W | E | R | T | Y | U | I | O | P |
| A | S | D | F | G | H | J | K | L | ; |
| Z | X | C | V | B | N | M | , | . | / |
| . | . | . | . | . | . | . | . | . | . |
| . | . | . | . | . | . | . | . | . | . |
| . | . | . | . | . | . | . | . | . | . |
| . | . | . | . | . | . | . | . | . | . |

FIG. 2

LINE-OF-SIGHT INPUT DEVICE, AND METHOD OF LINE-OF-SIGHT INPUT

CROSS-REFERENCE TO RELATED APPLICATIONS

The present application is a continuation application of International Application number PCT/JP2016/081025, filed on Oct. 19, 2016, which claims priority under 35 U.S.C. § 119(a) to Japanese Patent Application No. 2015-205946, filed on Oct. 19, 2015. Each of the above application(s) is hereby expressly incorporated by reference, in its entirety, into the present application.

BACKGROUND OF THE INVENTION

This invention relates to a line-of-sight input device, a method of a line-of-sight input, and a line-of-sight input program.

Conventionally, methods of a line-of-sight input for inputting by using a line-of-sight have been developed for people who cannot operate a keyboard, a mouse, or a touch panel due to physical disabilities.

For example, Japanese Patent Publication No. 5077879 (hereinafter Patent Document 1) discloses a method for determining an input element at a position of a cursor with a trigger of detecting a blink of an input operator after acquiring an image around an eyeball of the input operator, detecting a direction of line-of-sight of the input operator, and moving a cursor index between a plurality of input elements according to the direction of line-of-sight.

Further, Japanese Unexamined Patent Application Publication No. 2005-100366 (hereinafter Patent Document 2) discloses, as a method of scrolling a screen, a method of starting an application, with a trigger of detecting an intentional blink for more than or equal to three seconds, when an icon or the like reaches a selected region near a center of a screen by moving the whole screen toward the center of the screen according to a direction of line-of-sight.

There was a problem, however, that it was difficult for the conventional methods of line-of-sight input to determine a position quickly and precisely according to an intention of a user.

For example, the method of line-of-sight input of Patent Document 1 reads whether the direction of line-of-sight is right or left and sequentially moves a cursor one by one through input elements aligned on a screen, and so it takes time in proportion to the number of input elements through which the cursor must be moved. Although Patent Document 1 also discloses a method for accelerating movement speed of the cursor in accordance with the number of blinks or as a result of the user's line-of-sight being turned in the same direction, there was a problem that an operation error tends to take place if a user tries to place an accelerated cursor on a targeted input element.

Similarly, although the method of line-of-sight input of Patent Document 2 mentions a method for accelerating screen scroll speed when a user turns their line-of-sight in the same direction for more than or equal to three seconds, there was a problem that the user must maintain this line-of-sight even during a scroll at a relatively lower speed for a certain period of time, and an operation error tends to take place if the user tries to place a once-accelerated cursor on a targeted input element.

The present invention focuses on these points and provides a line-of-sight input device, a method of a line-of-sight input, and a line-of-sight input program that are capable of determining a position quickly and precisely according to an intention of a user.

BRIEF SUMMARY OF THE INVENTION

In order to achieve the above-mentioned object, the line-of-sight device according to the present invention is a line-of-sight input device for supporting a user's line-of-sight input corresponding to an input element represented on a display screen or with a sound image, including a detection means for detecting a point of gaze or an eyeball rotational movement of the user, a movement control means for moving the input element (i) toward a direction for a predetermined position of either the display screen or the sound image from the point of gaze detected by the detection means or (ii) in response to the eyeball rotational movement detected by the detection means, and an input determining means for determining an input of the input element near the predetermined position when a predetermined condition is satisfied, characterized by that the movement control means increases a movement speed of the input element as the point of gaze is farther from the predetermined position or a rotation angle of the eyeball rotational movement is larger, and makes the movement speed closer to zero as the point of gaze becomes nearer to the predetermined position or a rotation angle of the eyeball rotational movement becomes smaller.

BRIEF DESCRIPTION OF THE DRAWINGS

FIG. 2 shows an example of a virtual keyboard displayed by a display control section 102*a*.

DETAILED DESCRIPTION OF THE INVENTION

Hereinafter, a line-of-sight input device, a method of a line-of-sight input, and a line-of-sight input program according to the present embodiment of the present invention as well as an aspect of embodiment of a recording medium are explained in detail based on the drawings. It should be noted that, this invention is not limited with the aspect of the embodiment.

[Configuration of Line-of-Sight Input Device 100]

Figure 1:
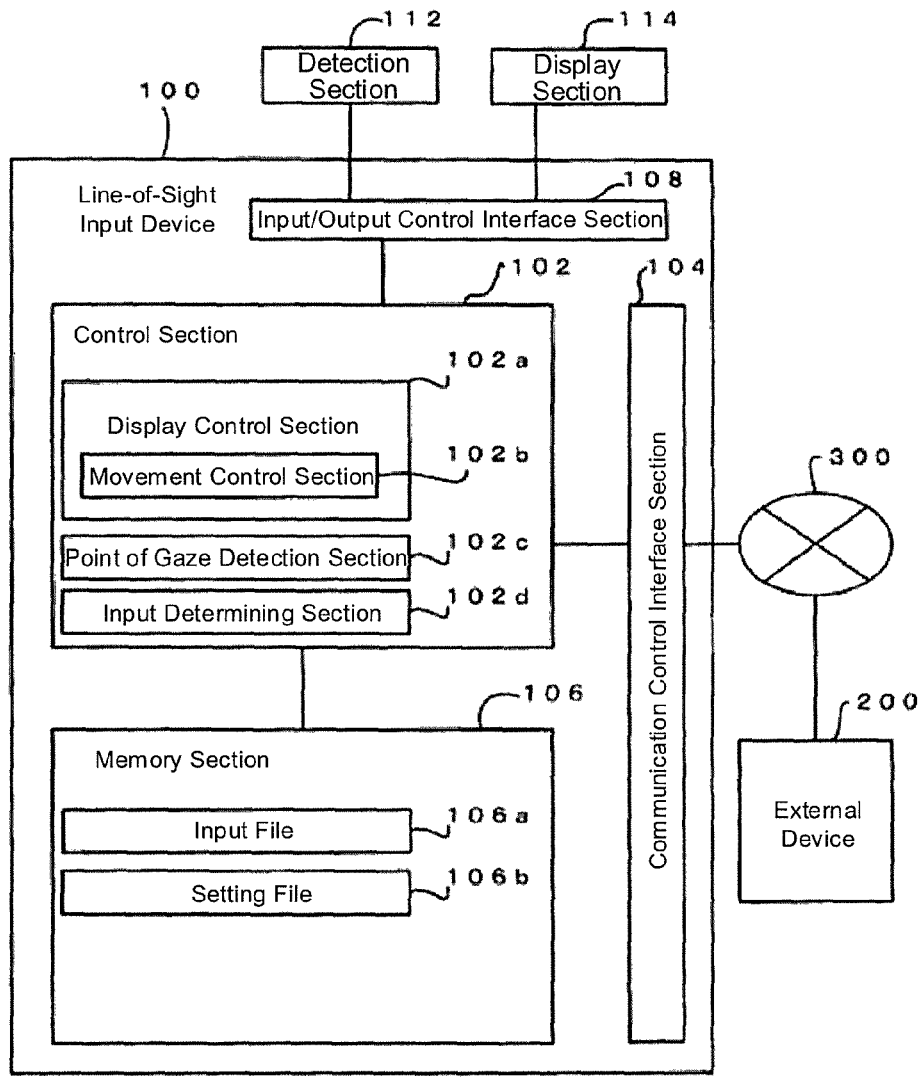
FIG. 1 is a block diagram showing an example of a configuration of a line-of-sight input device 100 according to the present exemplary embodiment.

The configuration of the line-of-sight input device of the present exemplary embodiment of the present invention is explained, and then processing and the like according to the present exemplary embodiment are explained in detail. Here, FIG. 1 is a block diagram showing an example of a configuration of a line-of-sight input device 100 according to the present exemplary embodiment. FIG. 1 conceptually shows only the configuration relevant to the present embodiment among the configurations.

In FIG. 1, the line-of-sight input device 100 is generally configured to include a control section 102 such as a CPU that conducts integrated controls over the line-of-sight input device 100, a communication control interface section 104 that is connected to a communication apparatus (not shown) such as a router connected to a communication line or the like, an input/output control interface section 108 that is connected to a detection section 112 for detecting line-of-sight or the like and a display section 114, and a memory section 106 that stores various databases and tables, and the sections are each connected to be able to communicate with each other via arbitrary communication paths.

The various databases and tables (an input file 106a, a setup file 106b, and the like) that are stored in the input file 106 are storage means such as a fixed disk or the like, and store various programs, table, files, databases, web pages, and the like to be used for various processing.

Among them, the input file 106a is an input data storage means that stores data such as input characters or the like. The input file 106a may store, for example, character data (text data or the like) corresponding to the character input element that was determined as an input by a line-of-sight input.

Further, the setup file 106b is a setup storing means that stores various pieces of setup information that was set up. For example, the setup file 106b may store setup information of movement speed, setup information of a display size, input switching information (for example, setup conditions whether there is Japanese phonetic alphabet input or alphabet input), and a count time (a predetermined time or the like) for determining an input.

Further, in FIG. 1, the input/output control interface section 108 controls the detection section 112 for detecting line-of-sight or the like or the display section 114. An image pickup device such as an ordinary visible light camera or an infrared camera, a well-known line-of-sight detection apparatus or a point of gaze measuring apparatus, a well-known eyeball movement detection device, an eyeball movement measurement device, a light emission converging device and the like may be used as the detection section 112. As an example, "EYE TRACKER" of Tobii Technology Ab., or "MEME" of JIN Inc. may be used as the detection section 112. Also, a monitor (including a television for domestic use, a personal computer's screen monitor, and the like) may be used as the display section 114. Here, the detection section 112 is not limited to performing the detection of line-of-sight or eyeball movement. The detection section 112 may detect movement of a body part such as movement of a hand, a finger, a foot, opening and closing of an eyelid, or the like. For example, the detection section 112 may recognize movement of a person by any detection means of a camera, an infrared sensor, or the like. As an example, the detection section 112 may detect a user's movement by using a well-known gesture recognition technique, a well-known motion sensor, and the like. The gesture may include any user's dynamic or static movement such as a movement of the finger, an arm, and a leg or a static posture which can be obtained from a position and a movement of the user in a physical space. In the detection section 112, a capturing device such as the camera may capture a user's image data and may recognize the user's gesture (one or more) based on the user's image data. More specifically, using a computer environment, the detection section 112 may recognize and analyze the gesture made by the user in the three-dimensional physical space of the user, and may transmit analyzed user's movement data, attribute data, or pre-analyzed raw data to the line-of-sight input device 100. As an example, the detection section 112 may recognize a movement of pointing in a certain direction, a movement of pushing out the hand in a certain direction, a movement of kicking the leg in a certain direction, or a movement of opening and closing the eyelid.

As an example of a well-known motion recognition means, "Kinect Sensor" for "Xbox One" of Microsoft Inc. can be used. According to the Kinect technology, skeleton operation data and attribute data of a whole body can be obtained. It should be noted that well-known sensors analyze movement or attributes of a person either by using a control means contained in the sensor or by using a control means of a connected computer. For example, these analyzing functions can be realized by a control means, such as a processor, of the detection section 112, or by a control means, such as a movement control section 102b described below, or by both control means. Additionally, the detection section 112 may further include a detection means such as a touch pad, a touch panel, or a microphone. Furthermore, the detection section 112 does not only directly detect a human body but also indirectly detect movements of a body by detecting movements of a controller or a marker, such as a two-dimensional tag, attached by a user such as "Oculus Touch controller" of "Oculus Rift" of Facebook Inc. It should be noted that the display section 114 may have a speaker. Here, the present invention can output sound image from multi-channel outputs of a plurality of speakers or the like. It should be noted that the line-of-sight input device 100 may include an input means such as a keyboard or a mouse for conducting an initial setting such as a trigger time for determining an input, zoom rate, the coordinate of origin as a predetermined position, or a command region, and the input/output control interface section 108 can control the input means.

Further, the control section 102 in FIG. 1 has an internal memory for storing a control program such as an OS (Operating System), a program that specifies various processing sequences or the like, and required data, and conducts information processing for performing various types of processing by using these programs or the like. The control section 102 is, conceptually, configured to include a display control section 102a, a point of gaze detection section 102c, and an input determination section 102d.

Among them, the display control section 102a is a display control means for controlling the display section 114. For example, the display control section 102a performs control to display input elements on a screen of the display section 114. As an example, the display control section 102a may perform control to display a virtual keyboard on the display section 114 by displaying keys, each of which corresponds to a respective character, as the input elements. Here, FIG. 2 shows an example of a virtual keyboard displayed by the display control section 102a.

As FIG. 2 shows, the display control section 102a may display, as a virtual keyboard, a customizable character board composed of columns and rows. It should be noted that oblique lines show a command region of a character "9", which represents an area where a character can be selected by a control of the communication control interface section 102*d* described below. It should be noted that it can be made to easily induce a point of view of a user by displaying a point whose color is red or the like at the center of each character.

Here, the input elements can be various selectable elements other than characters. For example, input elements for setting movement speed by a movement control section 102*b* described below, a display size (zoom rate), an input switch (such as switching between an alphabet input and a kana input), or the time for the input determining section 102*d* to determine an input may be assigned to keys on the character board of FIG. 2. Additionally, the display control section 102*a* may display, as input elements, a short-cut key, a start-up icon of an application, a link on a website, a thumbnail for displaying images, or the like. It should be noted that these input elements and data used for determining the input elements can be stored in the input file 106*a* of the memory section 106 in advance, or may be downloaded from an external system 200 through a network 300. Although an example of display output of the display control section 102*a* is explained in this embodiment, the present invention is not limited to this. For example, instead of performing the display output, the control section 102 may control a sound image output from a speaker or the like. For example, the control section 102 may control a speaker to output sound of an input element, such as a voice "A", having an orientation of sound.

Here, as shown in FIG. 1, the display control section 102*a* further includes the movement control section 102*b*. The movement control section 102*b* is a movement control means for moving input elements or the like according to a point of gaze or an eyeball rotational movement detected by the point of gaze detection section 102*c*. For example, the movement control section 102*b* may move the input elements from a point of gaze detected by the point of gaze detection section 102*c* in a direction of a predetermined position on the display screen. Further, as another example, the movement control section 102*b* may move the input elements from a point of gaze estimated on the basis of an eyeball rotational movement detected by the point of gaze detection section 102*c* in a direction of a predetermined position. It should be noted that a target to be moved is not limited to a display element, and a sound image, which is related to recognition of a direction from which a sound comes, may be moved. Here, the movement control section 102*b* may perform movement control by increasing the movement speed of the input elements or the like as a point of gaze is farther from a predetermined position and by making the movement speed closer to zero as a point of gaze becomes nearer to the predetermined position. Similarly, the movement control section 102*b* may increase the movement speed of an input element as a rotation angle of an eyeball rotational movement is larger, and make the movement speed closer to zero as the rotation angle is smaller. It should be noted that the movement control section 102*b* may move, other than the input elements, the background image of the image elements, a small screen containing the input elements, or the whole display screen together with the input elements.

Figure 3:
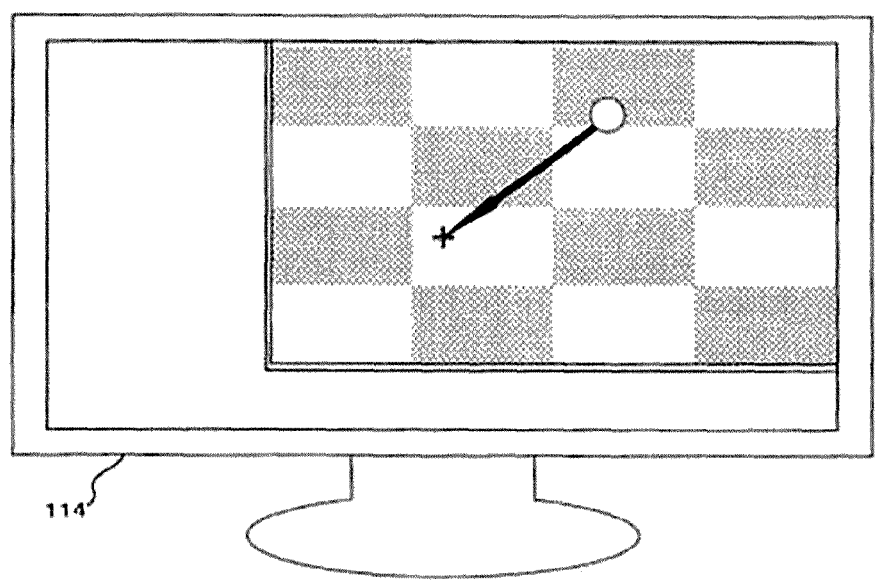
FIG. 3 schematically shows a display screen of a display section 114, a positional relationship between a point of gaze and a predetermined position, and a movement direction of a command version.

Here, FIG. 3 shows the positional relationship of the display screen of the display section 114, a point of gaze, and the predetermined position, and a movement direction of the command version. The cross-mark in the figure shows the predetermined position, and is located at the center of the display screen. Further, the round-mark in the figure shows the point of gaze detected by the point of gaze detection section 102*c*. It should be noted that the marks showing the predetermined position and the point of gaze may be displayed by the display control section 102*a*, or do not need be displayed.

As an arrow in FIG. 3 shows, the movement control section 102*b* performs movement control for moving the input elements or the like from a point of gaze detected by the point of gaze detection section 102*c* in the direction of the predetermined position on the display screen. Here, the direction of the arrow vector in the figure represents a direction from a point of gaze to the predetermined position. It should be noted that this arrow is shown for convenience in explaining a movement direction and is not typically shown on a display screen. Further, the checkered pattern in the figure represents a command version containing a plurality of command regions. In other words, this command version corresponds to a part of the virtual keyboard of FIG. 2 described above. In this figure, a character board corresponding to keys for 16 characters is shown. Further, performing movement control of this command version by control of the movement control section 102*b* corresponds to performing movement control of the whole virtual keyboard described above. According to this figure, a command region that has not been displayed appears by moving to the direction of the arrow by the control of the movement control section 102*b*.

The length of the arrow of FIG. 3, represents a distance from a point of gaze detected by the point of gaze detection section 102*c* to the predetermined position, and, as described above, the movement control section 102*b* performs movement control by increasing the movement speed of the input elements or the like as this distance is larger and by making the movement speed closer to zero as this distance becomes smaller. Here, the horizontal axis of FIG. 4 indicates the distance between the point of gaze and the predetermined position, and the vertical axis indicates the movement speed.

Figure 4:
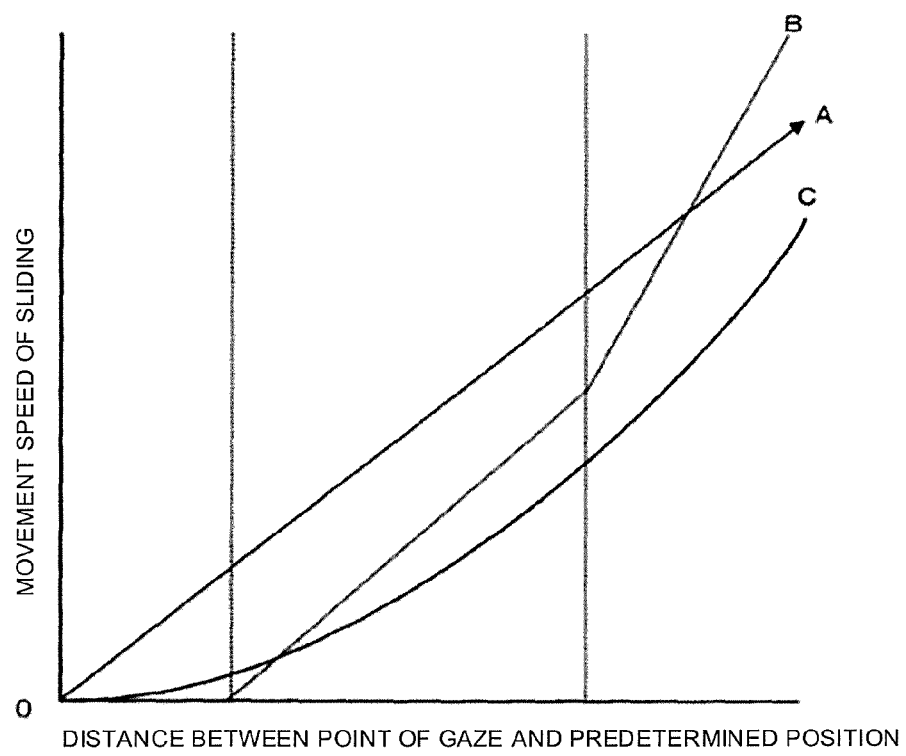
FIG. 4 is a graph showing a distance between the point of gaze and the predetermined position on a horizontal axis and movement speed on a vertical axis.

As an example, as the graph line A (a proportional line) of FIG. 4 shows, the movement control section 102*b* may perform movement control so that the movement speed increases in proportion to the distance between the point of gaze and the predetermined position such as the center point or the origin point of the display screen. Further, as another example, as the graph line B (a proportional line with multiple steps) the movement control section 102*b* may perform movement control so that a proportional constant becomes larger when the distance becomes larger than a predetermined threshold value. Further, as the graph line C (a quadratic function) shows, the movement control section 102*b* may perform movement control so that the movement speed increases in proportion to a square of the distance.

As was shown by the graph lines A to C as examples, the movement control section 102*b* decreases the movement speed of sliding the command version of a character board or the like according to the distance as the distance becomes shorter. By doing this, a position determining point (a predetermined position) can be quickly reached from a position apart from the predetermined position, and the movement speed can be decreased as the predetermined position is approached to precisely determine the position, and so a position determination can be realized with a high speed and with a smaller number of erroneous operations. It should be noted that the function between the distance and the movement speed is not limited to a primary function of the above A to C or the quadratic function. For example, an exponential function, a fourth-order function, a trigonometric function, or the like can be used. Further, the relationship between the distance and the movement speed was explained above, but the relationship can be similarly applied to an angle of eyeball rotation and the movement speed by replacing the "distance" with the "rotation angle". It should be noted that the rotation angle may be an angle relative to the direction of line-of-sight, assuming the direction of the predetermined position to be 0 degrees.

Returning again to FIG. 1, the point of gaze detection section 102c is a point of gaze detection means for detecting a point of gaze or an eyeball rotational movement of a user. Here, the point of gaze detection section 102c is not limited to directly detecting the point of gaze or the rotation angle of the eyeball, and may calculate a point of gaze or a rotation angle, by a function of detection section 112, on the basis of an image near an eyeball of the user by using well-known means by controlling the detection section 112 of an imaging means or the like, such as a camera. It should be noted that a part of the functions of the point of gaze detection section 102c and the detection section 112 together may be configured to be a point of view detection means, or the point of gaze detection section 102c or the detection section 112 may independently be configured to be a point of gaze detection means. A well-known point of gaze detection means or a point of gaze calculating method may be used. Further, the point of gaze detection section 102c may detect a line-of-sight by controlling the detection section 112 and may calculate a cross point between the detected line-of-sight and the plane of the display screen of the display section 114 as the point of gaze.

Further, the point of gaze detection section 102c may detect an eyeball rotation, an eyeball position, or an eyeball state by controlling the detection section 112, and a line-of-sight, a point of gaze, or a rotation angle may be derived on the basis of the detected eyeball rotation, eyeball position, and eyeball state. Further, here, the point of gaze detection section 102c may take a picture of an eyeball of a person and derive a line-of-sight or a rotation angle on the basis of the position of the pupil relative to the imaged eye. For example, the point of gaze detection section 102c may detect a line-of-sight on the basis of a moving point, corresponding to a moving portion on the image, with respect to a standard point, corresponding to a non-moving portion on the image. Here, as well-known methods for detecting a line-of-sight, there are a method for determining a line-of-sight on the basis of positional relationship by using an inner corner of an eye as the standard point and by using an iris as the moving point, a method for determining a line-of-sight on the basis of positional relationship obtained by a corneal reflection caused by infrared radiation by using a corneal reflection as the standard point and a pupil as the moving point, and the like.

Further, as shown by FIG. 1, the input determining section 102d is an input determining means that determines inputs under a predetermined condition. For example, the input determining section 102d may determine an input corresponding to an input element when the input element is near a predetermined position for a predetermined period of time. Here, any of the following states may be an example that an input element is near the predetermined position:
1) a state where a representing point of the input element enters within a predetermined region containing the predetermined position;
2) a state where a region of the input element overlaps the predetermined position; and
3) a state where a predetermined region and a region of the input element overlap.

In other words, the input determining section 102d may start to count when one of the above near states is reached, continue to count as this near state continues, and determine an input of the input element when a predetermine time passes. As described here, the input determining section 102d may use one of the following cases as a trigger of determining an input among:
1) a case where a representing point of the input element enters within a predetermined region containing the predetermined position;
2) a case where a region of the input element overlaps the predetermined position; and
3) a case where a predetermined region and a region of the input element overlap for a predetermined period of time.

Here, the input determining section 102d may refrain from starting to count when the speed of the point of gaze is larger than or equal to a predetermined threshold value or the distance between the point of gaze and the predetermined position is larger than or equal to a predetermined threshold value even if a predetermined state is reached. This configuration enables avoidance of an unexpected operation of initiating an input.

Here, a determination of an input is not limited to determining inputs of characters or the like, and determinations of inputs of enlargement or reduction of a map, a scroll, or the like are also included. For example, the input determining section 102d may determine inputs of enlargement or reduction of a display screen or a sound image when a predetermined condition is satisfied. Further, the input determining section 102d may determine, without being limited to the above, inputs of remote operations. For example, the input determining section 102d may determine remote operations of an external apparatus 200 such as a robot via the network 300.

Further, the communication control interface section 104 in FIG. 1 performs communication control between the line-of-sight input device 100 and the network 300 (or a communication apparatus such as a router). In other words, the communication control interface section 104 has a function of communicating data with other terminals such as the external apparatus 200 via a communication line, irrespective of whether being via a wired line or via a wireless line.

In other words, the line-of-sight input device 100 may be configured to communicably connect via the network 300 with an external database relating to input elements of a web page, image data, and the like, or the external apparatus 200 that provides external programs such as a line-of-sight input processing program or the like. This line-of-sight input device 100 may be communicably connected to the network 300 via a communication apparatus such as a router and wired or wireless communication lines such as a leased line.

Here, the network 300 in FIG. 1, which is the Internet or the like, has a function of connecting the line-of-sight input device 100 and the external apparatus 200.

Further, the external apparatus 200 in FIG. 1 is connected to the line-of-sight input device 100 via the network 300, and has a function of providing (i) an external database relating to image data or (ii) a website for executing a line-of-sight input program or the like to a user.

Here, the external apparatus 200 may be configured as a web server, an ASP server, or the like, and its hardware configuration may include an information processing apparatus such as a workstation or a personal computer and their attachments, which are, in general, commercially available. Further, each function of the external apparatus 200 is realized by a CPU, a disk device, a memory device, an input device, an output device, a communication control device, or the like, and a program to control them.

[Line-of-Sight Input Processing]

Figure 5:
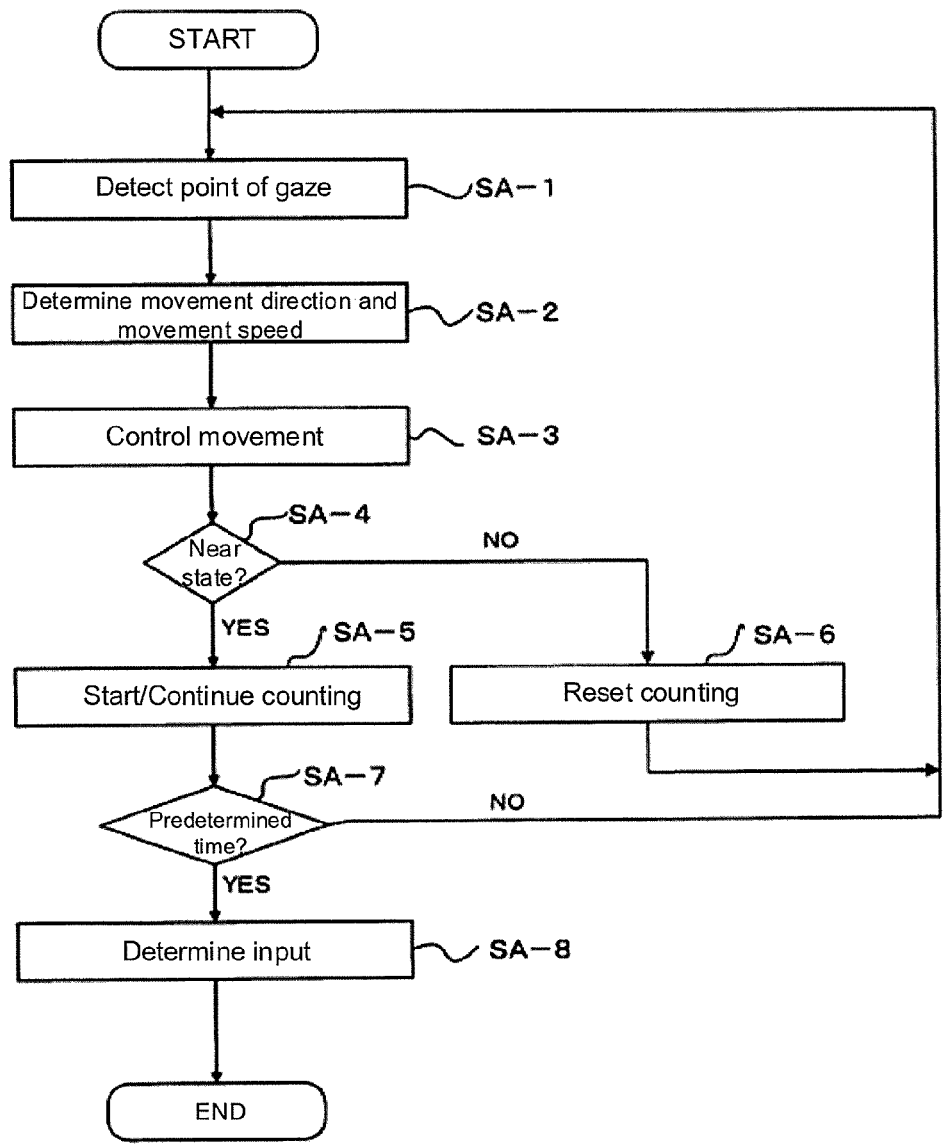
FIG. 5 is a flowchart showing an example of line-of-sight input processing according to the present exemplary embodiment.

Next, an example of a line-of-sight input processing performed by the line-of-sight input device 100 according to the present embodiment, configured like this, will be described in detail referring to FIG. 5. FIG. 5 is a flow chart showing an example of line-of-sight input processing according to the present embodiment. It should be noted that input elements are displayed on the display screen of display section 114 by processing of the display control section 102a.

As FIG. 5 shows, at the beginning, the point of gaze detection section 102c detects a point of gaze of a user (Step SA-1). More specifically, the point of gaze detection section 102c detects a line-of-sight or a point of gaze of a user who is looking at the display screen of the display section 114 by controlling the detection section 112 through the input/output control interface section 108. For example, the point of gaze detection section 102c calculates a line-of-sight by deriving a standard point and a moving point on an eyeball on the basis of an image around an eyeball obtained through the detection section 112 such as a camera, and may detect a point of gaze on the basis of the positional relationship between the line-of-sight and the display screen. Additionally, the point of gaze detection section 102c may detect a point of gaze by using a well-known point of gaze detection means or a well-known line-of-sight detection means.

Subsequently, the movement control section 102b determines a movement direction and a movement speed of a character board (an example of a command version) including a plurality of input elements on the basis of positional relationship between a point of gaze detected by the point of gaze detection section 102c and a predetermined position on the display screen (a coordinate of origin or the like, such as a center of the screen) (Step SA-2). Here, FIG. 6 shows a coordinate of origin (a cross mark in the figure) and a coordinate of a detected point of gaze (a large round marker in the figure), in a character board.

Figure 6:
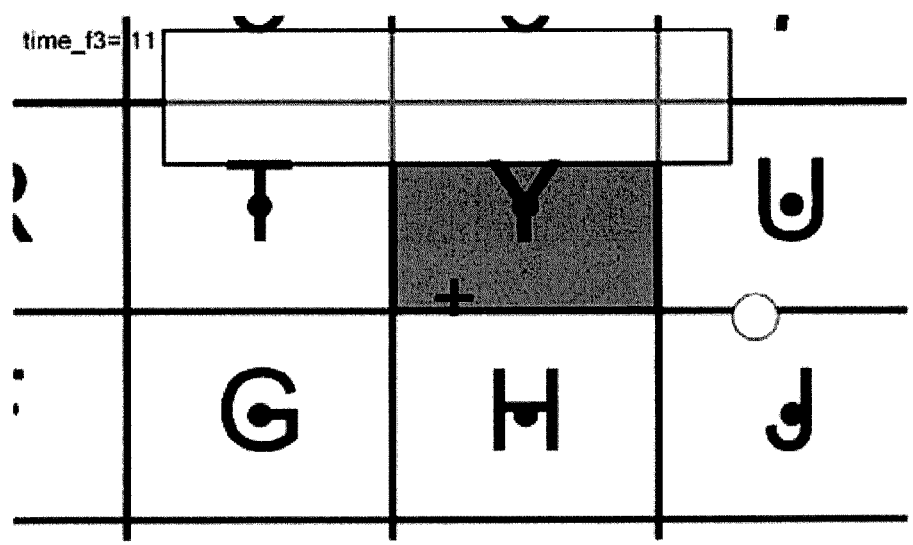
FIG. 6 shows a coordinate of origin (i.e., a cross-mark in the figure) and a coordinate of a point of gaze (i.e., a round-mark in the figure) on a character board.

As FIG. 6 shows, it is preferred that the coordinate of origin as a predetermined position is set to a position where a line-of-sight of a user is easily assigned or a position where a point of gaze is easily placed, such as a center of the screen of the display section 114. It should be noted that an area for displaying a character, which was determined as an input, may be provided in the top portion of the figure. In FIG. 6, the movement control section 102b determines the direction from the point of gaze to the coordinate of origin (substantially the left direction toward the figure) as a movement direction. Further, the movement control section 102b determines the movement speed according to the distance between the point of gaze and the coordinate of origin. For example, the movement control section 102b may calculate the movement speed by substituting a distance into a predetermined function (a primary function or a quadrative function).

Returning again to FIG. 5, the movement control section 102b moves the command version (for example a character board) including a plurality of input elements in the movement direction and at the movement speed that was determined on the basis of the point of gaze (Step SA-3).

Then, the input determining section 102d determines whether or not any of the input elements are near the coordinate of origin (Step SA-4). For example, the input determining section 102d may determine that the near state is reached in any of the following cases:

1) a state where a representing point of the input element enters within a rectangular region containing the coordinate of origin;
2) a state where a command region of the input element overlaps the coordinate of origin; and
3) a state where a rectangular region containing the coordinate of origin and a command region of the input element overlap.

If the input element is not near the coordinate of origin (Step SA-4, NO), the input determining section 102d resets the counter (Step SA-6), and returns to Step SA-1. In other words, the line-of-sight input device 100 repeats the Steps SA-1 to SA-6 described above.

Figure 7:
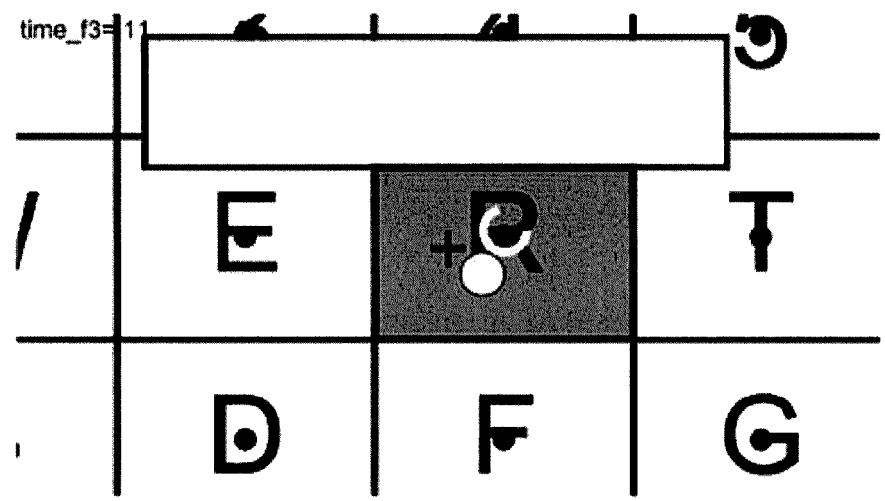
FIG. 7 shows an exemplary display screen in a case where a near state continued for a while after a count was started.

On the other hand, if any of the input elements are near the coordinate of origin (Step SA-4, YES), the input determining section 102d starts to count input determining triggers (Step SA-5). It should be noted that the input determining section 102d continues to count if the counting has already started. In the above FIG. 6, the counting is active (gray colored in the figure) because the coordinate of origin is within a command region of the character "Y". Here, FIG. 7 shows an example of a display screen in a case when a near state continues for a while after the coordinate of origin entered within a command region of the character "R" and the counting began.

In this example, the counting is continued when a command region of the input element overlaps the coordinate of origin, which corresponds to the above state 2), and when the point of gaze is within the same command region. As shown in FIG. 7, the display control section 102a displays a timer, in which an arc extends along a circumference as a visual feedback to a user, showing that an input element is in a selected state. It should be noted that the period of time for the arc to go around matches the predetermined time of an input determining trigger. Accordingly, a user can comprehend a time period left for determining an input (executing a command or the like) by the timer display.

Returning again to FIG. 5, the input determining section 102d determines whether or not the counting reaches a predetermined time of an input determining trigger (Step SA-7). If the predetermined time is not reached (Step SA-7, NO), the line-of-sight input device 100 returns to Step SA-1, and repeats the processing of Steps SA-1 to SA-7 described above.

Figure 8:
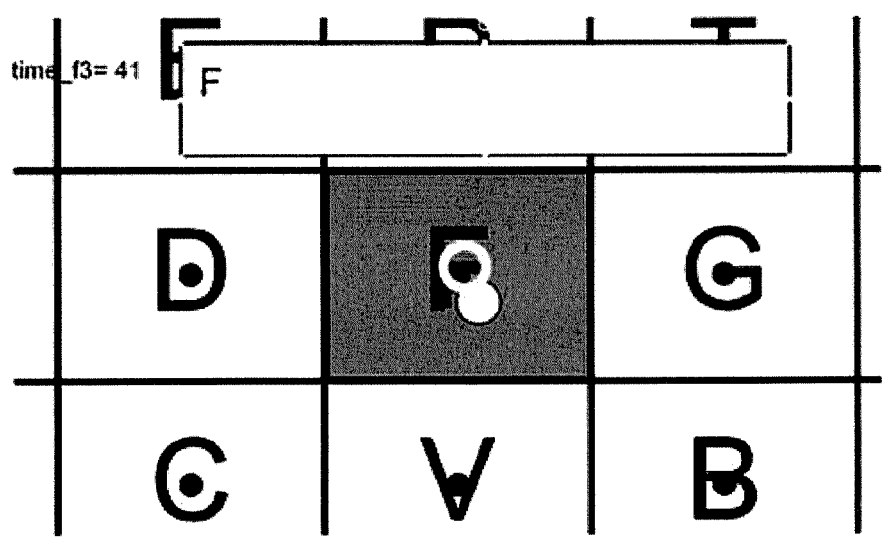
FIG. 8 shows an exemplary display screen in a case where the count reaches a predetermined period of time.

On the other hand, if the count reaches the predetermined time of the input determining trigger (Step SA-7, YES), the input determining section 102d determines an input of the corresponding input element, and stores input data to an input file 106a (Step SA-8). Here, FIG. 8 shows an example of a display screen when the count reaches the predetermined time. As shown in FIG. 8, because the coordinate of origin and the point of gaze stayed within a command region of an input element of a character "F" for a predetermined time, a command of inputting "F" is executed and the character "F" is input in the input character display area in the upward portion. It should be noted that the display control section 102a may change a color of the command region of the input element from a color of the selected state, for example, red, to a color of the input determined state, for example, blue, in order to show that the input element has changed from the selected state to the input determined state. The display control section 102a may use the differences of a highlighted display with oblique lines, sounds, or the like, instead of a color, as easy-to-understand feedback, to show the selected state or the input determined state to a user.

The above is an example of line-of-sight input processing according to the present embodiment. It should be noted that the line-of-sight input device 100 may control input elements to be repeatedly input by returning to Step SA-1 to repeat the above processing after an input determination is performed for an input element.

[An Example of Line-of-Sight Input Processing]

Figure 9:
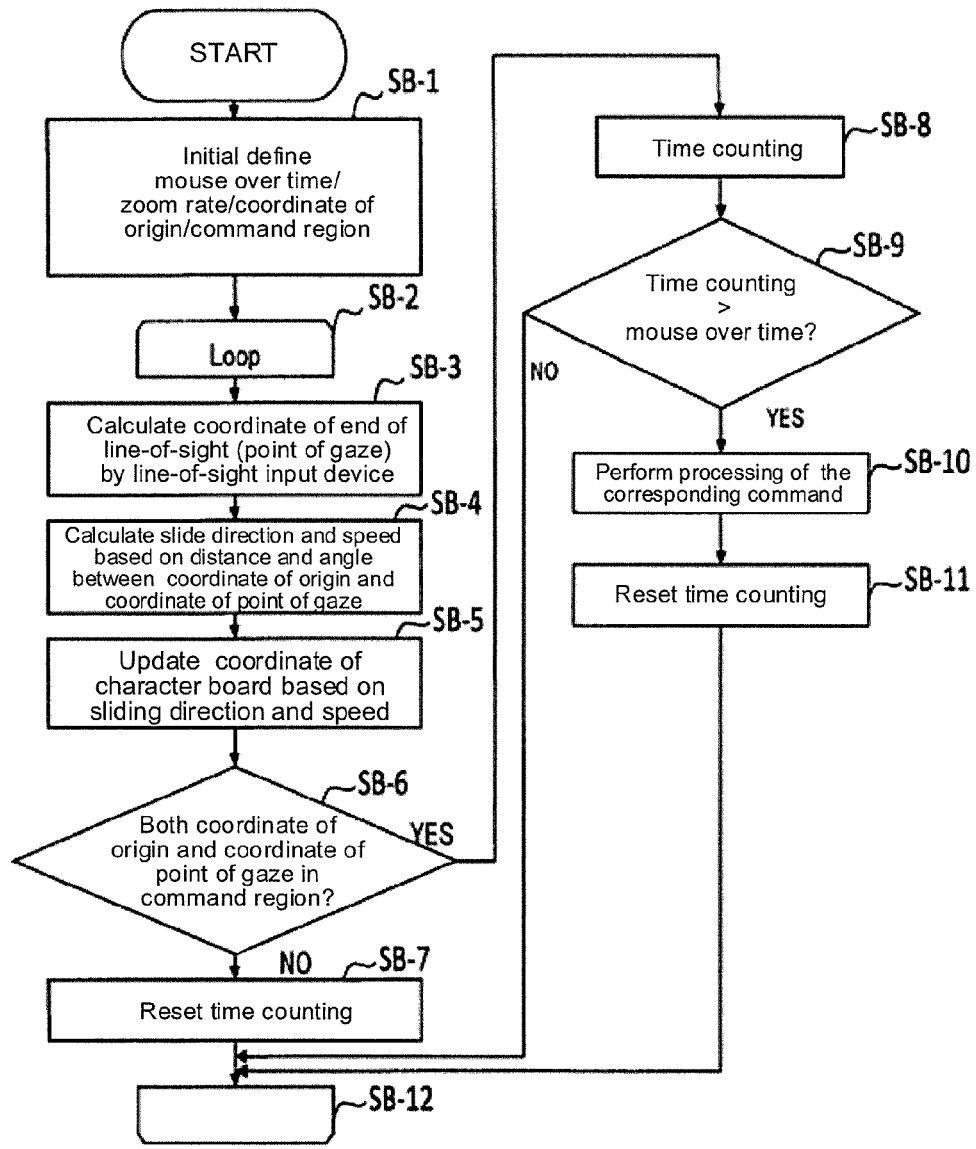
FIG. 9 is a flowchart showing an embodiment of the line-of-sight input process according to the present exemplary embodiment.

Next, as a further specific example, an embodiment of line-of-sight input processing performed by the line-of-sight input device 100 will be explained in detail, referring to FIG. 9 below. FIG. 9 is a flow chart showing an example of line-of-sight processing according to the present embodiment.

As shown in FIG. 9, the display control section 102, at the beginning, performs an initial defining of settings such as a mouse-over time for an input determination, a zoom rate of a display, a coordinate of origin, the command region, and the like (Step SB-1). It should be noted that the control section 102 may let a user perform an initial setting through an input means such as a keyboard and a mouse instead of limiting the user to performing the initial setting through the detection section 112. It should be noted that the control section 102 may perform a calibration of the point of gaze detection section 102*c* for detecting a point of gaze. The control section 102 stores the above setting information to a setting file 106*b* and uses it for various processing.

Subsequently, the control section 102 starts to perform loop processing of SB-2 to SB-12 below (Step SB-2).

In the loop processing, at the beginning, the point of gaze detection section 102*c* calculates a coordinate of a point of gaze at the end of the user's line-of-sight on the basis of the user's line-of-sight detected by the detection section 112 (Step SB-3).

Subsequently, the movement control section 102*b* calculates the direction and the speed of sliding the command version of the character board on the basis of a distance and an angle between the coordinate of a point of gaze and the coordinate of origin calculated by the point of gaze detection section 102*c* (Step SB-4).

Subsequently, the movement control section 102*b* updates the coordinate of the command version of the character board on the basis of the calculated sliding direction and speed (Step SB-5).

Subsequently, the input determining section 102*d* determines whether or not both of the coordinate of origin and the coordinate of the point of gaze enter an arbitrary command region (Step SB-6).

The control section 102 resets the counting time (Step SB-7) if both of the coordinate of origin and the coordinate of the point of gaze do not enter any command region (Step SB-6, NO), and starts a new loop processing (Step SB-12).

On the other hand, the input determining section 102*d* performs the time counting (Step SB-8) when both of the coordinate of origin and the coordinate of the point of gaze enter any command region (Step SB-6, YES).

Subsequently, the input determining section 102*d* determines whether or not the counted time becomes larger than the initially defined mouse-over time (Step SB-9). The input determining section 102*d* starts a new loop processing (Step SB-12), when the counted time is not larger than the mouse-over time (Step SB-9, NO).

On the other hand, the input determining section 102*d* performs a command corresponding to the command region (Step SB-10) when the counted time is larger than the initially defined mouse-over time (Step SB-9, YES).

Subsequently, the input determining section 102*d* resets the counted time (Step SB-11) and starts a new loop processing (Step SB-12). Here, the input determining section 102*d* may raise a flag for the command so that the same commands are not repeatedly input, and record flag information to the setting file 106*b* instead of resetting the counted time.

Examples of the line-of-sight input processing according to the present embodiment were described. This is the end of the explanations of the present embodiment.

Other Embodiments

The embodiments of the present invention have been described. The present invention may be performed with various different embodiments within the scope of the technical idea described in the claims apart from the above-mentioned embodiments.

For example, it was explained that the line-of-sight input device 100 performs processing in a stand-alone configuration, but the line-of-sight input device 100 may be configured to perform processing in response to a request from a client terminal such as an external apparatus 200, and return a result of the processing to the client terminal.

Further, the detecting processing is not limited to the above example, and a well-known line-of-sight detection means can be used. For example, calculating the distance and the orientation toward the object, on the basis of convergence angle information of both eyes and line-of-sight information, is allowed to obtain a relative position in order to control measurement of a point of gaze more precisely. Further, a well-known method of calculating a direction of line-of-sight, by detecting positions of an eyeball portion and the white of the eye portion by performing various image processing on image data of face portions of a person can be used, and a well-known method of detecting movements of an eyeball more precisely by making an operator wear designated equipment such as goggles or head gear can be used.

Further, the direction of line-of-sight may be directly measured by a detecting apparatus by using reflections in an eyeball. In other words, when electro-magnetic waves such as light are incident from the direction of line-of-sight, they reflect at the retina of the eyeball toward the direction of line-of-sight (an orientation opposite to the direction of incidence) and reach the detecting apparatus or the like. However, because light or the like does not pass the diameter of an eyeball, the light or the like does not reflect toward the orientation opposite the direction of incidence. A line-of-sight or a point of gaze may be detected by using this feature to combine an electro-magnetic wave generating apparatus and a detecting apparatus to detect electro-magnetic waves, reflected to the same position as the position where the electro-magnetic waves are generated. Further, the point of gaze detection section 102*c* may be configured by arbitrarily combining the above processing and apparatus.

Further, all or some of processing that was explained to be automatically performed may be manually performed, or all or some of processing that was explained to be manually performed may be automatically performed.

In addition, sequences of processing, sequences of control, specific names, information including registration data of each processing and parameters such as retrieval conditions, screen examples, and database configurations that were shown in the above documents or figures can be arbitrarily modified unless specifically described.

Further, each configured element of the line-of-sight input device 100 is functionally conceptual, and does not need to be physically configured as shown in the figures.

For example, for processing functions that each apparatus of the line-of-sight input device 100 includes, in particular, each processing function conducted by the display control section 102, all or an arbitrary part of them can be realized by a CPU (Central Processing Unit) and a program executed by the CPU, or by hardware with wired logics. It should be noted that the program is recorded in a non-transitory computer readable recording medium that contains programmed commands for causing a computer to perform a method regarding the present invention, and is read by the line-of-sight input device 100 when required. In other words, computer programs for providing commands to the CPU by cooperating with an OS (Operating System) to execute various processing is recorded in the memory section 106 such as a ROM or an HDD (Hard Disk Drive). This computer program is executed by being loaded to a RAM, and composes of the control section by cooperating with the CPU.

Further, this computer program may be stored in an application program server connected via an arbitrary network 300 to the line-of-sight input device 100 or the like, and all or a part of it can be downloaded when required.

Further, the program regarding the present invention may be stored in a computer readable recording medium, or may be configured as a program product. Here, this "recording medium" includes a memory card, a USB memory, an SD card, a flexible disk, an optical magnetic disk, ROM, EPROM, EEPROM, CD-ROM, MO, DVD, Blu-ray (registered trademark) Disk, and arbitrary "portable physical medium".

Further, "program" is a method of data processing described with arbitrary languages or methods of describing, and formats of the source codes and binary codes do not matter. It should be noted that the "program" is not necessarily configured independently, but includes programs configured to be dispersed as a plurality of modules or libraries and programs that realize their functions by cooperating with other programs represented by an OS (Operating System). It should be noted that well-known configuration or sequences may be used for specific configurations to read a recording medium in each apparatus shown in the embodiments or install sequences or the like after reading the recording medium. The program of the present invention may be configured as a program product recorded in a non-transitory computer readable recording medium.

Various databases or the like stored in the memory section 106 (input file 106a, setting file 106b or the like) are storing means such as a memory device such as a RAM or a ROM, a fixed disk device such as a hard disk, a flexible disk, and an optical disk, and store various program, table, databases, files for web pages, and the like used in various processing and providing web sites.

Further, the line-of-sight input device 100 may be configured as an information processing apparatus such as a well-known personal computer, a workstation, and an arbitrary peripheral apparatus may be connected to the information processing apparatus. Further, the line-of-sight input device 100 may be realized by implementing software (including a program, data, or the like) for causing the information processing apparatus to realize methods of the present invention.

Furthermore, the specific form of distribution and integration of the device is not limited to the illustrated form, and all or part thereof can be constituted with functional or physical distribution and integration based on any desired unit in accordance with various kinds of loads or in accordance with functional loads. In other words, the embodiment may be implemented with any desired combination, or the embodiment may be implemented selectively.

INDUSTRIAL APPLICABILITY

As explained above, according to the present invention, the line-of-sight input device, the method of a line-of-sight input, and the line-of-sight input program that are capable of determining the position quickly and precisely according to the intention of the user can be provided.

What is claimed is:

1. A line-of-sight input device for supporting a user's line-of-sight input corresponding to an input element represented on a display screen, comprising:
   a detection section that detects a point of gaze or an eyeball rotational movement of the user;
   a movement control section that moves the input element (i) in a direction toward a predetermined position of either the display screen from the point of gaze detected by the detection section or (ii) in response to the eyeball rotational movement detected by the detection section; and
   an input determining section that determines an input of the input element near the predetermined position when a predetermined condition is satisfied; wherein the movement control section increases a movement speed of the input element as the point of gaze is farther from the predetermined position or a rotation angle of the eyeball rotational movement is larger, and makes the movement speed closer to zero as the point of gaze becomes nearer to the predetermined position or the rotation angle of the eyeball rotational movement becomes smaller
   wherein the input determining section starts to count when at least one of the following states, as the predetermined condition, is reached:
   1) a state where a representing point of the input element enters within a predetermined region containing the predetermined position;
   2) a state where a region of the input element overlaps the predetermined position; and
   3) a state where the predetermined region and a region of the input element overlap, and
   the input determining section determines an input corresponding to the input element when the state continues for a predetermined period of time.

2. The line-of-sight input device according to claim 1, wherein the predetermined position is a fixed position on the display screen.

3. The line-of-sight input device according to claim 1, wherein the predetermined position is a position for determining the input of the input element on the display screen.

4. The line-of-sight input device according to claim 1, wherein the movement control section performs movement control with one of the following methods:
   1) a method of increasing the movement speed in proportion to a distance between the point of gaze and the predetermined position or the rotation angle;
   2) a method of increasing a proportional constant of the above method 1) when the distance or the rotation angle becomes larger than a predetermined threshold value; and
   3) a method of increasing the movement speed in proportion to a square of the distance or the rotation angle.

5. The line-of-sight input device according to claim 1, wherein the input element is an element corresponding to a character, and a virtual keyboard is displayed on the display screen.

6. The line-of-sight input device according to claim 1, wherein the input element is related to at least one of a setting of the movement speed, a setting of a display size, or a setting of an input switching.

7. The line-of-sight input device according to claim 1, wherein the line-of-sight input device comprises an input determining section for enlarging or reducing the display screen when a predetermined condition is satisfied.

8. The line-of-sight input device according to claim 1, wherein the line-of-sight input device comprises an input determining section that conducts a predetermined remote operation when a predetermined condition is satisfied.

9. The line-of-sight input device according to claim 1, wherein the input determining section does not start to count when the speed of the point of gaze is larger than or equal to a predetermined threshold value or a distance of the point of gaze from the predetermined position is larger than or equal to a predetermined threshold value, even when the state is reached.

10. The line-of-sight input device according to claim 1, wherein the movement control section moves the input element in a direction toward the predetermined position from a point of gaze that is estimated according to an eyeball rotational movement detected by the detection section.

11. A method of line-of-sight input for supporting a user's line-of-sight input corresponding to an input element represented on a display screen, executed by a computer, comprising the steps of:
    detecting a point of gaze or an eyeball rotational movement of the user;
    moving the input element (i) in a direction toward a predetermined position of either the display screen from the point of gaze detected by the detecting step or (ii) in response to the eyeball rotational movement detected by the detecting step; and
    determining an input of the input element near the predetermined position when a predetermined condition is satisfied, wherein the moving step increases a movement speed of the input element as the point of gaze is farther from the predetermined position or a rotation angle of the eyeball rotational movement is larger, and makes the movement speed closer to zero as the point of gaze becomes nearer to the predetermined position or the rotation angle of the eyeball rotational movement becomes smaller
    wherein the determining the input of the input element starts to count when at least one of the following states, as the predetermined condition, is reached:
    1) a state where a representing point of the input element enters within a predetermined region containing the predetermined position;
    2) a state where a region of the input element overlaps the predetermined position; and
    3) a state where the predetermined region and a region of the input element overlap, and
    the determining the input of the input element determines an input corresponding to the input element when the state continues for a predetermined period of time.

12. A non-transitory computer readable medium for storing a program for line-of-sight input for making a computer execute a method of line-of-sight input for supporting a user's line-of-sight input corresponding to an input element represented on a display screen, comprising the steps of:
    detecting a point of gaze or an eyeball rotational movement of the user;
    moving the input element (i) in a direction toward a predetermined position of either the display screen from the point of gaze detected by the detecting step or (ii) in response to the eyeball rotational movement detected by the detecting step; and
    determining an input of the input element near the predetermined position when a predetermined condition is satisfied, wherein the moving step increases a movement speed of the input element as the point of gaze is farther from the predetermined position or a rotation angle of the eyeball rotational movement is larger, and makes the movement speed closer to zero as the point of gaze becomes nearer to the predetermined position or the rotation angle of the eyeball rotational movement becomes smaller
    wherein the determining the input of the input element starts to count when at least one of the following states, as the predetermined condition, is reached:
    1) a state where a representing point of the input element enters within a predetermined region containing the predetermined position;
    2) a state where a region e input element overlaps the predetermined position; and
    3) a state where the predetermined region and a region of the input element overlap, and
    the determining the input of the input element determines an input corresponding to the input element when the state continues for a predetermined period of time.

* * * * *